(12) United States Patent
Bai et al.

(10) Patent No.: US 12,479,709 B2
(45) Date of Patent: Nov. 25, 2025

(54) POP-UP APPARATUS

(71) Applicant: AGENCY FOR DEFENSE DEVELOPMENT, Daejeon (KR)

(72) Inventors: Ik Hyun Bai, Daejeon (KR); Kyung Bo Lee, Daejeon (KR); Jae Hun Yoo, Daejeon (KR)

(73) Assignee: AGENCY FOR DEFENSE DEVELOPMENT, Daejeon (KR)

( * ) Notice: Subject to any disclaimer, the term of this patent is extended or adjusted under 35 U.S.C. 154(b) by 42 days.

(21) Appl. No.: 18/794,342

(22) Filed: Aug. 5, 2024

(65) Prior Publication Data
US 2025/0042708 A1 Feb. 6, 2025

(30) Foreign Application Priority Data

Aug. 2, 2023 (KR) .................. 10-2023-0100938

(51) Int. Cl.
*B66F 19/00* (2006.01)
*C06D 5/00* (2006.01)
*F03G 7/00* (2006.01)
*F42B 8/12* (2006.01)

(52) U.S. Cl.
CPC ............. *B66F 19/00* (2013.01); *C06D 5/00* (2013.01); *F03G 7/008* (2021.08); *F42B 8/12* (2013.01); *B66F 2700/09* (2013.01)

(58) Field of Classification Search
CPC ........ B66F 19/00; B66F 2700/09; C06D 5/00; F03G 7/008; F42B 8/12
See application file for complete search history.

(56) References Cited

U.S. PATENT DOCUMENTS

| 5,967,133 A | 10/1999 | Gardner, Jr. | |
|---|---|---|---|
| 2008/0174124 A1* | 7/2008 | Takahashi | B60R 21/34 |
| | | | 292/45 |
| 2012/0280191 A1* | 11/2012 | Siebelink | B66F 7/18 |
| | | | 254/129 |
| 2014/0123868 A1* | 5/2014 | Kobayashi | C06D 5/00 |
| | | | 102/530 |

(Continued)

FOREIGN PATENT DOCUMENTS

| JP | 2004-177270 A | 6/2004 |
|---|---|---|
| KR | 10-1994-0004642 A | 3/1994 |

(Continued)

OTHER PUBLICATIONS

English translation (Year: 2003).*

(Continued)

*Primary Examiner* — Fatemeh Esfandiari Nia
(74) *Attorney, Agent, or Firm* — NSIP Law (57) ABSTRACT

A pop-up apparatus is provided. The pop-up apparatus includes a base unit arranged on a reference surface and having a hollow portion formed therein, a pop-up unit formed to surround the base unit and reciprocating with respect to the base unit, a connection unit arranged on an upper end of the pop-up unit, a holder unit connected to the pop-up unit by the connection unit and configured to hold an object, and a gas generation unit arranged inside the base unit and configured to generate gas, wherein internal pressure of the base unit may increase due to the gas generated from the gas generation unit and the pop-up unit may be lifted.

8 Claims, 6 Drawing Sheets

(56) References Cited

U.S. PATENT DOCUMENTS

2017/0057457 A1* 3/2017 Narita ..................... C06D 5/00

FOREIGN PATENT DOCUMENTS

| KR | 10-2011-0096863 A | | 8/2011 | |
|---|---|---|---|---|
| KR | 10-2014-0139944 A | | 12/2014 | |
| KR | 10-1610740 B1 | | 4/2016 | |
| KR | 10-1957292 B1 | | 3/2019 | |
| TW | 200302178 A | * | 8/2003 | ........... B60R 21/261 |

OTHER PUBLICATIONS

Ik Hyun Bai et al. "Research on the Application of Propellant to Pop-up Heavy Loads" *Spring Academic Conference The Society for Aerospace System Engineering*(May 19, 2023).

\* cited by examiner

POP-UP APPARATUS

CROSS REFERENCE TO RELATED APPLICATIONS

This application claims the benefit of Korean Patent Application No. 10-2023-0100938, filed on Aug. 2, 2023, in the Korean Intellectual Property Office, the entire disclosure of which is incorporated herein by reference for all purposes.

Field of the Invention

One or more embodiments relate to a pop-up apparatus.

Description of the Related Art

In sled tests in which a weight is exposed to a high-speed dynamic environment, an experimenter uses a pop-up apparatus to pop up the weight to a certain height that matches experimental conditions, thereby generating vertical dynamic motion of the weight. A conventional pop-up apparatus uses a spring incorporated inside the pop-up apparatus and uses the principle of instantly pushing out and popping up the weight by using a compressed force of the spring. However, since a conventional pop-up apparatus uses a spring, there is a risk to working environments due to spring elasticity when installing the pop-up apparatus and there is an issue that a lot of time and human resources are required during installation and disassembly processes. In addition, as the weight of a pop-up object increases, it is difficult to achieve the purpose of the pop-up apparatus due to physical limitations of spring elasticity coefficients and workability during a compression process. As the weight of pop-up objects increases, there is a need to develop a pop-up apparatus that may easily control pop-up propulsion forces without being driven only by spring elasticity.

Korean Patent Application No. 10-2014-0139944 (publication date Dec. 8, 2014) discloses an air rocket launcher for training purposes.

The above description is information the inventor(s) acquired during the course of conceiving the present disclosure, or already possessed at the time, and is not necessarily art publicly known before the present application was filed.

SUMMARY

Problems to be Solved

According to an embodiment, a pop-up apparatus that may perform a function of popping up an object using combustion pressure of a propellant may be provided.

According to an embodiment, a pop-up apparatus that is convenient for a test operation may be provided since compressive force of an elastic body is not used to pop up an object.

Means to Solve the Problem

According to an aspect, there is provided a pop-up apparatus including a base unit arranged on a reference surface and having a hollow portion formed therein, a pop-up unit formed to surround the base unit and reciprocating with respect to the base unit, a connection unit arranged on an upper end of the pop-up unit, a holder unit connected to the pop-up unit by the connection unit and configured to hold an object, and a gas generation unit arranged inside the base unit and configured to generate gas, wherein internal pressure of the base unit may increase due to the gas generated from the gas generation unit and the pop-up unit may be lifted.

The base unit may include a stopper configured to limit a range of motion of the pop-up unit and an exhaust hole formed through a side wall of the base unit.

The gas generation unit may include a housing and an ignition element configured to ignite a propellant, wherein, by using combustion pressure of the propellant, pressure inside the base unit may be increased and the pop-up unit may be pushed up.

A surface of the ignition element may be formed with a perforation structure so that the ignition element releases gas generated by combustion of the propellant.

The housing may include a mounting portion mounted on a lower end of the base unit, a pillar portion extending from the mounting portion and having the ignition element arranged inside the pillar portion, and a diffusion hole formed through a side wall of the pillar portion.

The pop-up apparatus may further include an ignition control unit connected to the ignition element inside the gas generation unit with an ignition line.

The exhaust hole may be arranged at a lower portion of the base unit.

A plurality of exhaust holes may be formed and a number of exhaust holes arranged may change depending on a height of the base unit.

One side of the stopper may be provided with an elastic body so that the pop-up unit and the base unit collide elastically.

A lower end of the pop-up unit may have a curved shape so that a range of motion of the pop-up unit is limited by physically interfering with the stopper.

The exhaust hole may include a structure in which the exhaust hole is manually opened or closed according to test conditions.

Additional aspects of embodiments will be set forth in part in the description which follows and, in part, will be apparent from the description, or may be learned by practice of the disclosure.

Advantageous Effects

According to embodiments, a pop-up apparatus may perform a function of popping up an object using combustion pressure of a propellant.

According to embodiments, a pop-up apparatus may facilitate a test operation since compressive force of an elastic body is not used to pop up an object.

BRIEF DESCRIPTION OF THE DRAWINGS

These and/or other aspects, features, and advantages of the invention will become apparent and more readily appreciated from the following description of embodiments, taken in conjunction with the accompanying drawings of which.

DETAILED DESCRIPTION

Hereinafter, embodiments of the present disclosure are described in detail with reference to the accompanying drawings. Regarding the reference numerals assigned to the components in the drawings, it should be noted that the same components are designated by the same reference numerals, wherever possible, even though they are shown in different drawings. Also, in the description of the embodiments, detailed description of well-known related structures or functions is omitted when it is deemed that such description will cause ambiguous interpretation of the present disclosure.

In addition, in the description of the components of the embodiments, terms such as first, second, A, B, (a), (b), and the like may be used. These terms are used only for the purpose of discriminating one component from another component, and the nature, the sequences, or the orders of the components are not limited by the terms. When one component is described as being "connected", "coupled", or "attached" to another component, it should be understood that one component may be connected or attached directly to another component, and an intervening component may also be "connected", "coupled", or "attached" to the components.

The same name may be used to describe an element included in the embodiments described above and an element having a common function. Unless otherwise mentioned, the descriptions on the embodiments may be applicable to the following embodiments and thus, duplicated descriptions will be omitted for conciseness.

Figure 1:
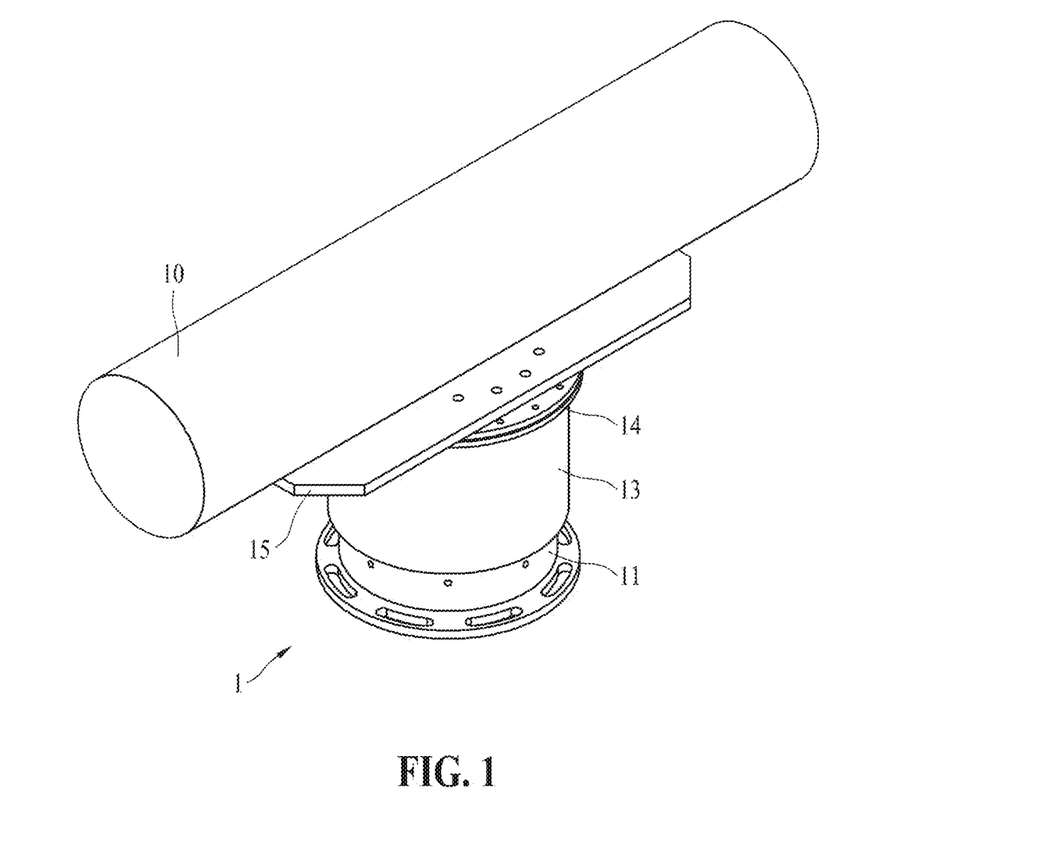
FIG. 1 is a perspective view of a pop-up apparatus on which an object is placed, according to an embodiment.
Figure 2:
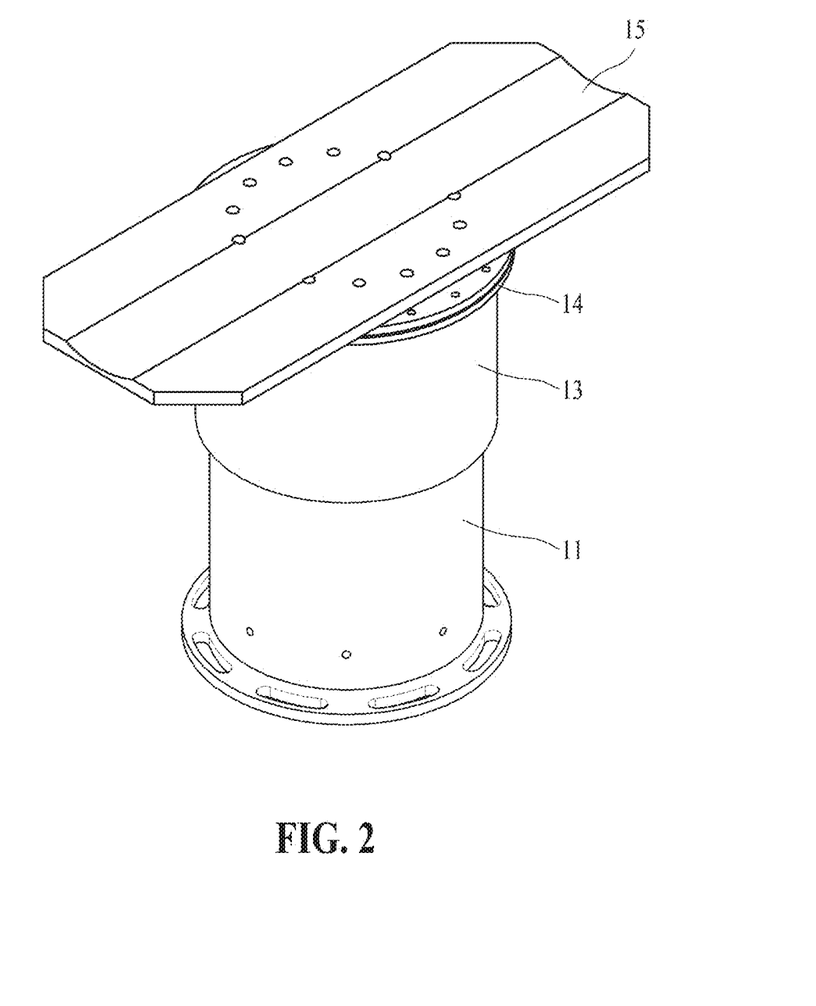
FIG. 2 is a perspective view of the pop-up apparatus according to an embodiment.
Figure 3:
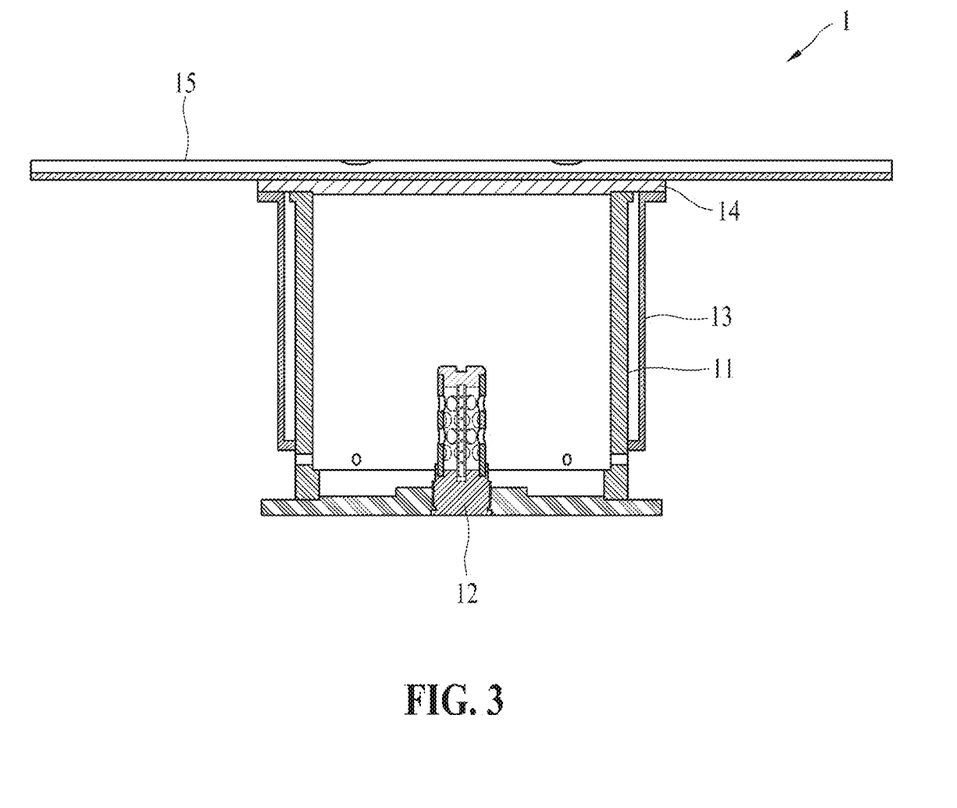
FIG. 3 is a cross-sectional view of a portion of the pop-up apparatus according to an embodiment.

FIG. 1 is a perspective view of a pop-up apparatus on which an object is placed, according to an embodiment, FIG. 2 is a perspective view of the pop-up apparatus according to an embodiment, and FIG. 3 is a cross-sectional view of a portion of the pop-up apparatus according to an embodiment.

Referring to FIGS. 1 to 3, a pop-up apparatus 1 according to an embodiment may perform a function of popping up an object 10 by using combustion pressure of a propellant. That is, since compressive force of an elastic body is not used to pop up the object 10, a test operation may be facilitated. According to a conventional spring pop-up system, safety of working environments is compromised by using high-elasticity springs, and a lot of time and equipment are required for system installation. The pop-up apparatus 1 may solve such issues since the pop-up apparatus 1 uses a propellant and has an advantage of performing tests to pop up the object 10 under various test conditions by changing the amount of the propellant. For example, the pop-up apparatus 1 may raise internal pressure of a base unit 11 by gas generated from a gas generation unit 12 and may lift a pop-up unit 13. By raising the pop-up unit 13, a holder unit 15 may rise and the object 10 may be popped up in a short period of time. When the object 10 pops up, the object 10 may be released and pop out from the holder unit 15 by inertia, and the pop-up unit 13 may descend as the pressure inside the base unit 11 decreases. Here, the operating time of the pop-up apparatus 1 may be 100 milliseconds (ms) or less, and the pop-up speed may be 7.67 meters per second (m/s) to 8.86 m/s. That is, the object 10 may be popped up at high speed by combustion of the propellant. As described below, the pressure inside the base unit 11 may be controlled by an exhaust hole 112 (see FIG. 5). For example, the pop-up apparatus 1 may include the base unit 11, the pop-up unit 13, a connection unit 14, the gas generation unit 12, the holder unit 15, and an ignition control unit (not shown).

The base unit 11 may be arranged on a reference surface and may have a hollow portion formed therein. The base unit 11 may be formed with a bottom and a side, and an upper portion may be formed in an open state. The base unit 11 may function as a chamber for propellant combustion and gas pressure may be generated inside. Since the pop-up unit 13 is arranged to slide by coupling to surround the outside of the base unit 11, as the pressure inside the base unit 11 rises, the pop-up unit 13 may slide and vertical movement may be implemented on the object 10. After the vertical movement, the object 10 may be separated from the holder unit 15 and may move dynamically due to inertia of the object 10. Here, the pop-up height of the object 10 may be 2 meters (m) to 4 m, and the weight of the object 10 may be 150 kilograms (kg) to 200 kg. The base unit 11 may be formed into a cylindrical shape with an inner radius of about 150 millimeters (mm) and the thickness of a side wall may be formed to be 15.75 mm. However, the base unit 11 is not limited thereto and may be configured to suit experimental conditions.

The gas generation unit 12 may be arranged inside the base unit 11 and may generate gas. For example, the gas generation unit 12 may be arranged at the center of the lower end portion of the base unit 11 to facilitate gas diffusion. The gas generation unit 12 may increase the pressure inside the base unit 11 by using gas generated by burning the propellant.

The pop-up unit 13 may be formed to surround the base unit 11 and may reciprocate with respect to the base unit 11. According to this structure, the pop-up unit 13 may slide vertically along the side surface of the base unit 11 as the pressure inside the base unit 11 increases. The lower end of the pop-up unit 13 may have an inwardly curved shape to physically interfere with a stopper 111 (see FIG. 4) to limit a range of motion of the pop-up unit 13. That is, the inwardly curved shape at the lower end of the pop-up unit 13 and the stopper 111 protruding at the upper end of the base unit 11 may prevent the pop-up unit 13 from being completely separated from the base unit 11 by combustion pressure due to the interlocking phenomenon. For example, the inner radius of the pop-up unit 13 may be 177.3 mm and the thickness of the side wall may be formed to be 5.5 mm. However, the pop-up unit 13 is not limited thereto and may be configured to suit experimental conditions.

The connection unit 14 may be arranged on the upper end of the pop-up unit 13. The connection unit 14 may connect the pop-up unit 13 to the holder unit 15 while sealing an open portion of the pop-up unit 13. According to this structure, when the pressure inside the base unit 11 increases, the pressure is also applied to the inner side surface of the connection unit 14, and the connection unit 14 and the pop-up unit 13 may be moved together away from the base unit 11. The connection unit 14 may be formed integrally with the pop-up unit 13 to form a single structure and does not necessarily have to be formed as a separate structure to be connected with the pop-up unit 13, as shown in FIG. 3. A seal may be formed at a connection portion between the connection unit 14 and the pop-up unit 13 to prevent gas from flowing. The thickness of the connection unit 14 may be formed to be about 14 mm.

The holder unit 15 may be connected to the pop-up unit 13 by the connection unit 14 and may hold the object 10. The holder unit 15 may have a depressed middle portion to prevent the object 10 having curvature from rolling off. The holder unit 15 may be formed to have a sufficient width and length to stably hold the object 10, and may also be formed in a shape that becomes more depressed toward the center. When the holder unit 15 is excessively heavy, the pop-up function due to combustion of the propellant may not be sufficiently embodied, so the holder unit 15 may be formed of a lightweight and robust material with little shape deformation.

The ignition control unit may be connected to an ignition element 122 inside the gas generation unit 12 by an ignition line. The exhaust hole 112 may include a structure in which the exhaust hole 112 is manually opened or closed according to test conditions. For example, the exhaust hole 112 may be manually opened or closed in advance depending on the weight of the object 10, a pre-targeted height, and the amount of propellant included in the ignition element 122.

Figure 4:
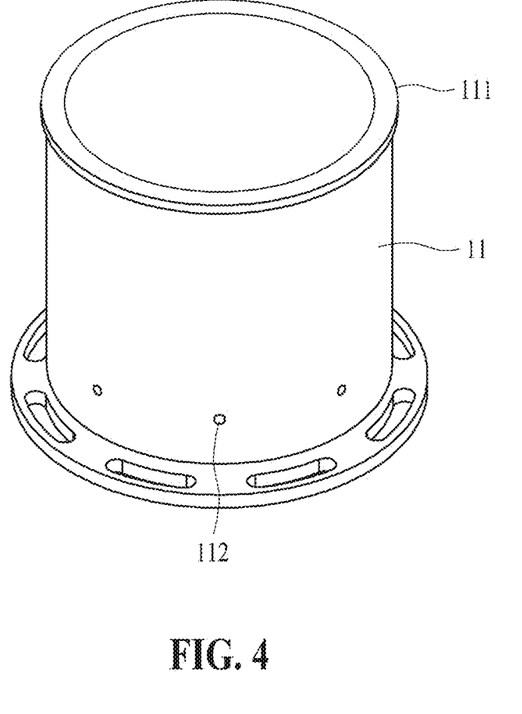
FIG. 4 is a perspective view of a base unit according to an embodiment.
Figure 5:
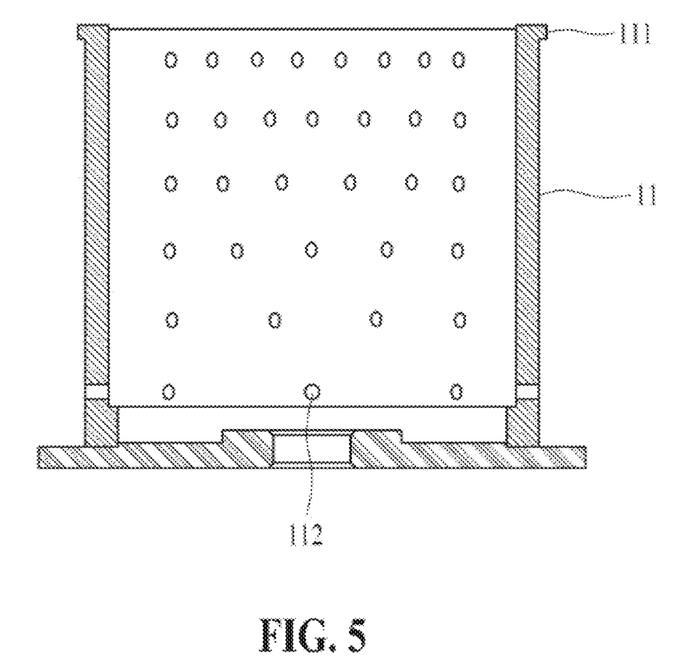
FIG. 5 is a cross-sectional view of the base unit according to an embodiment.

FIG. 4 is a perspective view of a base unit according to an embodiment, and FIG. 5 is a cross-sectional view of the base unit according to an embodiment.

Referring to FIGS. 4 and 5, the base unit 11 may include the stopper 111 and the exhaust hole 112.

The stopper 111 may be formed to limit a range of motion of the pop-up unit 13. The stopper 111 may be formed to protrude from the upper portion of the base unit 11 and may physically interfere with the pop-up unit 13 to prevent the pop-up unit 13 from being completely separated from the base unit 11. For example, an elastic body may be provided on one side of the stopper 111 to make the pop-up unit 13 and the base unit 11 elastically collide. Here, a function of the elastic body may be not to make the pop-up unit 13 pop up with the propellant combustion pressure, but to induce the pop-up unit 13 that has reached the stopper 111 to elastically collide, thereby increasing the amount of change in momentum of the object 10 and facilitating the object 10 to pop up.

The exhaust hole 112 may be formed through the side wall of the base unit 11. The exhaust hole 112 may easily discharge the pressure of gas generated inside the base unit 11. The exhaust hole 112 may have a size of about 6 mm in diameter, a plurality of exhaust holes 112 may be provided, and "8 to 12" exhaust holes 112 may be arranged, but embodiments are not limited thereto. Due to the exhaust hole 112, the remaining gas of the base unit 11 may be released after the vertical movement of the pop-up unit 13. Here, the total area of the exhaust hole 112 may be about 0.07 percent (%) of the outer surface area of the base unit 11 excluding the area of the exhaust hole 112. For example, the exhaust hole 112 may be arranged at the lower portion of the base unit 11. Furthermore, FIG. 5 also shows an example of the arrangement of the exhaust holes 112, and the plurality of exhaust holes 112 may be arranged in different numbers depending on the height of the base unit 11. For example, more exhaust holes 112 may be arranged at the upper end of the base unit 11 than at the lower end of the base unit 11. According to this structure, pressure leakage that may occur during the vertical movement of the pop-up unit 13 may be minimized and the pressure inside the base unit 11 after the vertical movement may be easily discharged. On the contrary, depending on experimental conditions, more exhaust holes 112 may be arranged at the lower end rather than the upper end of the base unit 11.

Figure 6:
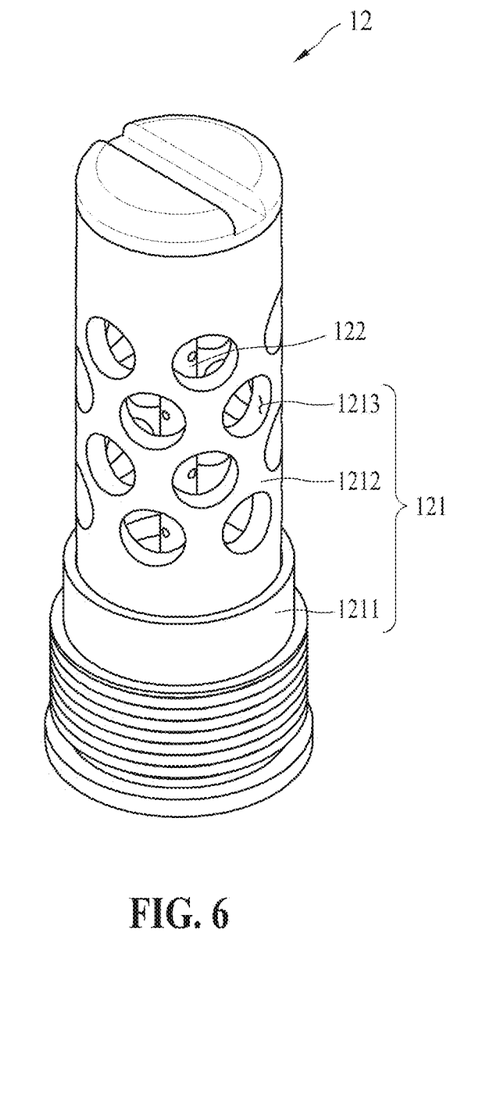
FIG. 6 is a perspective view of a gas generation unit according to an embodiment.

FIG. 6 is a perspective view of a gas generation unit according to an embodiment.

Referring to FIG. 6, the gas generation unit 12 may be arranged inside the base unit 11 to generate gas. For example, the gas generation unit 12 may include a housing 121 and the ignition element 122.

The housing 121 may be formed to surround the ignition element 122 and may diffuse gas emitted from the ignition element 122. A removable cap may be provided on the upper surface of the housing 121. The housing 121 may include a mounting portion 1211, a pillar portion 1212, and a diffusion hole 1213.

The mounting portion 1211 may be mounted on the lower end of the base unit 11. The mounting portion 1211 may have screw threads so that the mounting portion 1211 may be easily mounted on and removed from the base unit 11 by turning the mounting portion 1211. According to this structure, through a simple operation, the gas generation unit 12 may be separated from the base unit 11 to add the propellant or may be replaced. A seal may be formed on the screw threads of the mounting portion 1211 to prevent gas pressure from escaping through a gap between the gas generation unit 12 and the base unit 11.

The pillar portion 1212 may extend from the mounting portion 1211 and the ignition element 122 may be arranged inside the pillar portion 1212. The pillar portion 1212 may extend vertically from the mounting portion 1211 and may induce gas generated by the ignition element 122 to easily diffuse into the inside of the base unit 11.

The diffusion hole 1213 may be formed by penetrating a side wall of the pillar portion 1212. There may be a plurality of diffusion holes 1213, and the diffusion holes 1213 may be evenly arranged 360 degrees on the outer wall of the pillar portion 1212. The diffusion holes 1213 may be formed with a diameter of about 15 mm and "24" diffusion holes 1213 may be formed. The total area of the diffusion holes 1213 may be approximately 34% of the area of the pillar portion 1212 in which the diffusion holes 1213 are not formed. The diameters of the diffusion holes 1213 may not all be the same, and the diffusion holes 1213 with larger diameters may be arranged toward the upper end of the pillar portion 1212. In addition, the number of diffusion holes 1213 may be increased towards the upper end of the pillar portion 1212. According to this structure, since the gas is induced to diffuse from the upper portion of the pillar portion 1212, the pressure difference between the lower portion of the housing 121, where the gas pressure is formed high, and the upper portion of the housing 121, where the gas pressure is formed relatively low, may be reduced.

The ignition element 122 may combust the propellant. Due to the ignition element 122, combustion pressure of the propellant may be generated, and the combustion pressure may increase the pressure within the base unit 11 and may push up the pop-up unit 13. Here, it is confirmed that 10 grams (g) to 16 g of propellant is used to lift the object 10 weighing about 170 kg about 3 m to 4 m. As the amount of propellant increases, the height at which the object 10 is popped up tends to increase. That is, by controlling the amount of propellant, the internal pressure of the base unit 11 may be increased, thereby controlling the pop-up height of the object 10. The ignition element 122 may have a surface formed with a perforated structure and may release gas generated by combustion of the propellant. The diameter of perforations may be formed to be approximately 2.49 mm, and "24" perforations may be formed. The total area of the perforations may be about 6% of the area of the ignition element 122 in which no perforations are formed.

A number of embodiments have been described above. Nevertheless, it should be understood that various modifications may be made to these embodiments. For example, suitable results may be achieved if the described techniques are performed in a different order and/or if components in a described system, architecture, device, or circuit are combined in a different manner and/or replaced or supplemented by other components or their equivalents.

DESCRIPTION OF REFERENCE NUMBERS

10: Object
1: Pop-up apparatus
11: Base unit
111: Stopper
112: Exhaust hole
12: Gas generation unit
121: Housing
1211: Mounting portion
1212: Pillar portion
1213: Diffusion hole
122: Ignition element
13: Pop-up unit
14: Connection unit
15: Holder unit

What is claimed is:

1. A pop-up apparatus comprising:
a base having a hollow portion formed therein;
a pop-up portion comprising a lower end and an upper open end such that the base is inserted through the lower end, enclosed by the lower end, and reciprocates with respect to the pop-up portion;
a connector plate disposed to cover the upper open end of the pop-up portion;
a holder disposed on a first surface of the connector plate and configured to hold an object; and
a gas generator arranged in the hollow portion of the base and configured to generate gas,
wherein internal pressure of the base increases due to the gas generated from the gas generator thereby lifting the pop-up portion,
wherein a second surface of the connector plate opposite to the first surface contacts with an entire edge of the upper open end of the pop-up portion to seal the pop-up portion,
wherein the base comprises a lower portion and an upper portion, where the upper portion is disposed closer to the connector plate than the lower portion,
wherein the base comprises a plurality of exhaust holes disposed on the side wall of the base, and
wherein a number of the plurality of exhaust holes disposed on the upper portion of the base is greater than a number of the plurality of exhaust holes disposed on the lower portion of the base.

2. The pop-up apparatus of claim 1, wherein the base comprises:
a stopper disposed at the upper portion of the base and configured to limit a range of motion of the pop-up portion by contacting the lower end of the pop-up portion.

3. The pop-up apparatus of claim 1, wherein the gas generator comprises:
a housing; and
an ignitor disposed inside the housing and configured to ignite a propellant,
wherein, by using combustion pressure of the propellant, pressure inside the base is increased to move the pop-up portion.

4. The pop-up apparatus of claim 3, wherein a surface of the ignitor comprises a plurality of pores to release gas generated by combustion of the propellant.

5. The pop-up apparatus of claim 3, wherein the housing comprises:
a mounting portion mounted on a lower end of the base;
a pillar portion extending from the mounting portion such that the ignitor is disposed inside the pillar portion; and
a diffusion hole disposed on a side wall of the pillar portion.

6. The pop-up apparatus of claim 3, further comprising:
an ignition controller connected to the ignitor by an ignition line.

7. The pop-up apparatus of claim 2, wherein a portion of the stopper contacting the lower end of the pop-up portion comprises an elastic body to provide an elastic contact between the pop-up portion and the base.

8. The pop-up apparatus of claim 2, wherein the stopper is a portion of the base extended from the upper portion of the base and contacting the lower end of the pop-up portion thereby a range of motion of the pop-up portion is limited by physical contact between the stopper and the lower end of the pop-up portion.

* * * * *